United States Patent
Cadonau

(10) Patent No.: US 9,689,757 B2
(45) Date of Patent: Jun. 27, 2017

(54) STRAIN TRANSMITTER

(71) Applicant: KISTLER HOLDING AG, Winterthur (CH)

(72) Inventor: Thomas Cadonau, Züberwangen (CH)

(73) Assignee: KISTLER HOLDING AG, Winterthur (CH)

( * ) Notice: Subject to any disclaimer, the term of this patent is extended or adjusted under 35 U.S.C. 154(b) by 0 days.

(21) Appl. No.: 14/428,522

(22) PCT Filed: Sep. 27, 2013

(86) PCT No.: PCT/CH2013/000172
§ 371 (c)(1),
(2) Date: Mar. 16, 2015

(87) PCT Pub. No.: WO2014/047743
PCT Pub. Date: Apr. 3, 2014

(65) Prior Publication Data
US 2015/0233777 A1    Aug. 20, 2015

(30) Foreign Application Priority Data
Sep. 27, 2012  (CH) ....................................... 1742/12

(51) Int. Cl.
*G01L 1/00*   (2006.01)
*G01L 1/18*   (2006.01)
(Continued)

(52) U.S. Cl.
CPC .............. *G01L 1/18* (2013.01); *G01B 5/0014* (2013.01); *G01B 7/18* (2013.01)

(58) Field of Classification Search
CPC .......... G01B 5/0014; G01B 7/18; G01B 7/16; G01L 1/18; G01L 1/2262; G01L 1/2206;
(Continued)

(56) References Cited

U.S. PATENT DOCUMENTS 4,275,406 A * 6/1981 Muller .................. G01L 9/0042
257/254
7,441,467 B2 * 10/2008 Bloom ...................... G01L 1/20
73/819

(Continued)

FOREIGN PATENT DOCUMENTS

CN    101046368 A    10/2007
CN    101608960 A    12/2009
(Continued)

OTHER PUBLICATIONS

International Search Report, issued Nov. 11, 2013.
(Continued)

*Primary Examiner* — Harshad R Patel
*Assistant Examiner* — Brandi Hopkins
(74) *Attorney, Agent, or Firm* — Dority & Manning, P.A.

(57) ABSTRACT

A strain transmitter for detecting strain of a structure includes a strain body, which has a strain axis with fastening devices for fastening the strain body on a structure, and a measurement element, which is arranged centrally between the fastening devices on the strain axis. The measurement element includes a metal sheet. The entire surface of a statically measuring, piezo-resistant silicon chip, which is connected to a full bridge and emits a voltage in the strained state proportional to the level of strain, is applied to the metal sheet. The measurement element includes a printed circuit board, and electric contacts are guided from the silicon chip along the printed circuit board.

14 Claims, 2 Drawing Sheets

(51) Int. Cl.
  *G01B 5/00*   (2006.01)
  *G01B 7/16*   (2006.01)

(58) Field of Classification Search
  CPC . G01L 1/00; G01L 3/10; G01L 1/2293; G01L 5/0004; G01L 5/24; G01L 1/2243; G01K 7/22; F02F 3/00; G08C 17/02; G01N 19/00; F16B 31/02; E21B 47/0006; E21B 17/023
  USPC .......... 73/777, 774, 761, 708, 720, 862.627, 73/726–727
  See application file for complete search history.

(56) References Cited

U.S. PATENT DOCUMENTS

| 8,186,232 | B2 | 5/2012 | McDearmon et al. |
| 8,939,039 | B2* | 1/2015 | Ratcliffe ............. E21B 47/0006 73/862.627 |
| 2002/0166385 | A1 | 11/2002 | Bloom et al. |
| 2006/0207339 | A1 | 9/2006 | Sumigawa et al. |
| 2007/0017295 | A1 | 1/2007 | Ohta et al. |
| 2007/0228500 | A1 | 10/2007 | Shimazu et al. |
| 2009/0301215 | A1* | 12/2009 | McDearmon ............ G01B 7/16 73/774 |
| 2011/0259112 | A1* | 10/2011 | Shimazu .................. G01B 7/18 73/774 |

FOREIGN PATENT DOCUMENTS

| EP | 1 840 500 | 10/2007 |
| GB | 1 456 403 | 11/1976 |
| GB | 1 469 644 | 4/1977 |
| JP | 58-118920 A1 | 7/1983 |
| JP | 07-065922 B2 | 8/1988 |
| JP | 04-075931 U1 | 2/1992 |
| JP | 06-066621 U1 | 9/1994 |
| JP | 2007263781 A | 11/2007 |
| JP | 2009128153 A1 | 6/2009 |
| JP | 2009539116 A | 12/2009 |
| WO | WO 2007/140378 A2 | 12/2007 |

OTHER PUBLICATIONS

International Preliminary Report on Patentability for PCT/CH2013/000172, issued Mar. 31, 2015.
Chinese Search Report, dated Nov. 16, 2016.

* cited by examiner

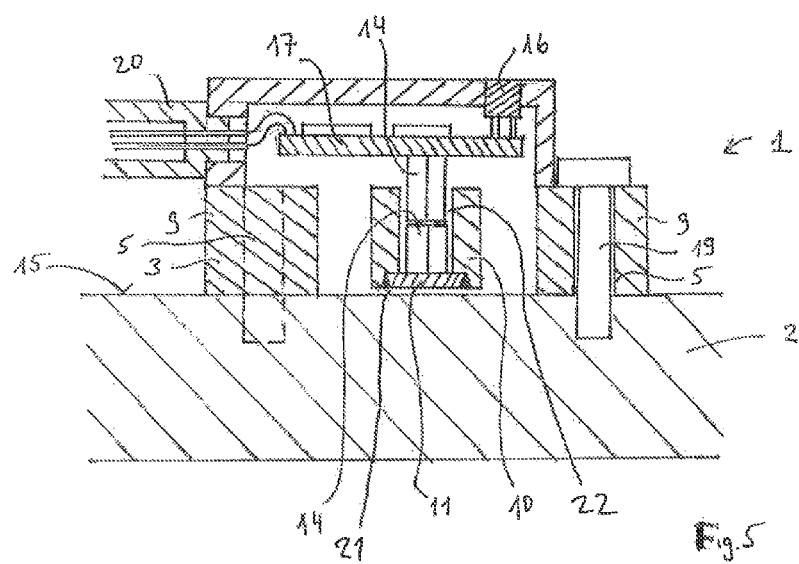

STRAIN TRANSMITTER

CROSS-REFERENCE TO RELATED APPLICATIONS

This application claims priority to International Application Serial No. PCT/CH2013/000172, filed Sep. 27, 2013, which claims priority to Swiss Application No. 1742/12 filed Sep. 27, 2012. International Application Serial No. PCT/CH2013/000172 is hereby incorporated herein in its entirety for all purposes by this reference.

FIELD OF THE INVENTION

The invention concerns a strain transmitter for purposes of registering a strain on a structure, comprising a strain body with a strain axis, with attachment devices for purposes of attaching the strain body to a structure, also a measuring element, which is centrally arranged between the said attachment devices on the structure, on the strain axis.

BACKGROUND

Strain transmitters are, for example, mounted on machine structures in order to monitor processes. In the case of injection moulding machines, for example, the closure force of the moulding tools is monitored with strain transmitters, whereby strain gauges are generally used for this purpose. These deliver very reliable measurements for large strains that originate from large forces, such as those that occur as the tools close. However, it should also be possible, on the other hand, to measure very small forces, During the movement a so-called mould protection function is designed to protect the tool from damage, in that the closure of the mould parts is stopped immediately if a component has not been correctly removed from the mould. For this purpose it must be possible to register the smallest forces with respect to strains on the tool.

Strain gauges can register small strains less well. Piezoelectric strain transmitters, on the other hand, are excellently suitable for the registration of both small and large strains, but unfortunately they cannot conduct static measurements.

In GB 1456403 an S-shaped strain transmitter is specified, which features centrally a chip with a measuring bridge, and which can deduce the strain on the basic structure on the basis of the shear stress determined. It has been shown that making contacts with such a chip is very cumbersome.

BRIEF SUMMARY OF THE INVENTION

The object of the present invention is to specify a strain transmitter of the type described in the introduction, which can register both very small and very large measurements, and which can also conduct static measurements. Moreover it should be easy to make contact with, and should also be able to compensate easily for temperature fluctuations on the structure.

The object is achieved in that the measuring element comprises a plate, on which a piezo-resistive silicon chip is mounted over its full surface area; this chip can conduct static measurements, is connected to a full bridge, and outputs a voltage proportional to its strain, whereby a circuit board is mounted on the measuring element, which is electrically connected with electrical contacts of the silicon chip. The circuit board essentially comprises conducting tracks insulated from the plate, which in a preferred arrangement are in turn electrically connected with a connector, which likewise is arranged on the plate.

Such a silicon chip, connected to a full bridge, has a sensitivity approximately 60 times higher than that of a conventional strain gauge sensor, likewise connected to a full bridge, and can therefore register even very low level signals down to approximately 1 microstrain (1 με), that is to say 1 micrometre per metre (μm/m). In contrast to piezoelectric sensors the silicon chip, connected to a resistance bridge, outputs a voltage signal and can conduct static measurements.

Since the chip is arranged on a plate and is already connected with contacts via a circuit board, the measuring element as such can be checked for its functionality before it is mounted onto the strain body. By this means a defective chip can be identified and rejected at an early stage, so that the failure rate of the finished products can be greatly reduced.

The plate can be welded onto the strain body along all its peripheral edges so that a secure connection is created.

The plate is preferably mounted on the lower face of the strain body, on which face the strain body sits when mounted on a mounting plane of the structure. The plate should, however, be spaced apart from this mounting plane by a small separation distance, for example a capillary separation distance, so that no friction between plate and structure distorts the measurement. The proximity to the structure ensures that the temperature on the measuring element is the same as that on the structure. To this end the chip and the circuit board lie on the back side of the plate facing away from the structure. A continuous opening in the strain body through to its lower face on the back side of the plate provides access for a terminal connection to the connector or to suitable contacts on the circuit board.

BRIEF DESCRIPTION OF THE DRAWINGS

In what follows the invention is explained in more detail with reference to the figures. Here:

FIG. 5 shows a schematic representation in cross-section of an inventive strain transmitter with amplifier, mounted on a structure.

DESCRIPTION OF EXEMPLARY EMBODIMENTS OF THE INVENTION

Figure 3:
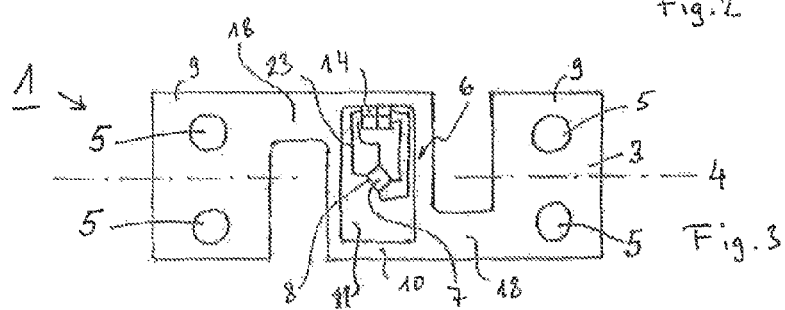
FIG. 3 shows a representation of an inventive strain transmitter in a preferred embodiment.

The invention concerns a strain transmitter 1 for purposes of detecting a strain on a structure 2, when the strain transmitter 1 is mounted on the latter. FIG. 3 shows a simple preferred form of an inventive strain transmitter 1. An example of such a strain transmitter 1 is represented in FIG. 5, attached to a structure 2 and comprising an amplifier.

Figure 1:
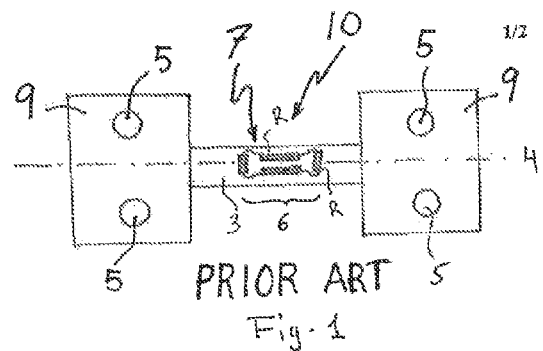
FIG. 1 shows a schematic representation of a strain transmitter in accordance with the prior art.

FIG. 1 shows a strain transmitter in accordance with the prior art. It has a strain body 3 with a central strain axis 4, along which the strain body 3 is strained during a measurement. The strain body 3 comprises two end regions 9, each with two attachment devices 5, and also a central region 10 with a measuring element 6, which in particular is also arranged centrally between the attachment devices 5 on the strain axis 4. The said measuring element 6 contains four strain-sensitive resistances R, connected so as to form a full bridge 7; here each of the resistances R is arranged parallel to, or at right angles to, the strain axis.

Figure 2:
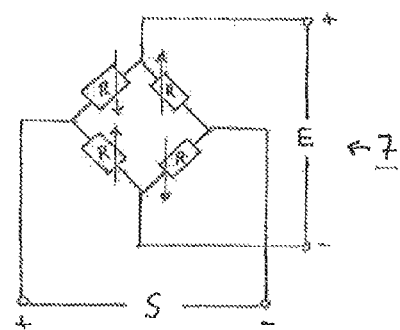
FIG. 2 shows a description of a full bridge for use in an inventive strain transmitter.

In FIG. 2 a full bridge, as it is preferably deployed in the inventive arrangement, is described in more detail. Each pair of opposing bridges between the resistances form in each case terminals for the power supply E+, E− respectively for the voltage drop S+, S− of the measured signal, which here is designated as V. In contrast to the arrangement in FIG. 1, the resistances R in the full bridge 7 in FIG. 2 are arranged at a 45° angle to the strain axis 4, which effects an increase in the sensitivity of the measuring element by approximately 50% compared with the arrangement in FIG. 1.

The inventive strain transmitter 1 is fitted with a strain body 3, which comprises a silicon chip 8 with a full bridge in accordance with FIG. 2 integrated therein; the strain body outputs a voltage proportional to its strain.

FIG. 3 shows an inventive strain body 3, as it is preferably installed in an inventive strain transmitter 1. The said strain body 3 possesses a shape similar to that of an S; it can also resemble a mirrored S. The said strain body 3 has in turn two outer end regions 9, each with two attachment devices 5, and also a central region 10 with the measuring element 6. In an inventive form of the embodiment the connections 18 of the central region to the outer regions 9 are arranged symmetrically with respect to the central point external to the strain axis 4. The strain axis 4 therefore runs twice between the attachment devices 5 external to the strain body 3. In the event of a pull between the attachment devices 5, the central region 10 of the strain body 3 is rotated and distorted, since it is only connected with the end regions at the connections 18. Since these connections 18 are arranged symmetrically with respect to the central point external to the strain axis 4, a moment acts on the central region 10. The measuring element 6 for the inventive strain transmitter preferably registers shear stress. This is an advantage because shear stress occurs in a much more homogeneous form than tensile stress.

Figure 4:
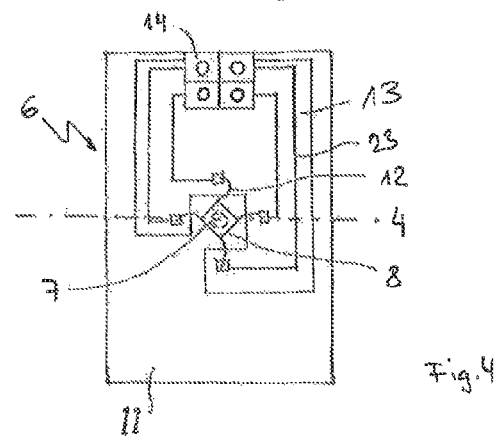
FIG. 4 shows a schematic representation in plan view of a measuring element for an inventive strain transmitter.

FIG. 4 represents such a measuring element 6 with a plate 11, on which, preferably centrally, the silicon chip 8 is mounted over its the full surface area of the chip 8. The measuring element 6 also comprises a circuit board 13, whereby electric contacts 12 are led from the silicon chip 8 via the circuit board 13. The circuit board 13 comprises at least conducting tracks 23, which are mounted in an insulated manner on the plate 11. The plate 11 preferably comprises a connector 14, which is in contact with the conducting tracks 23. In other circumstances the circuit board 13 can have contact points, not represented, which can make direct contact with terminal connections to an amplifier or an evaluation unit.

In the registration of shear stress, the silicon chip 8 is mounted diagonally on the plate 11, such that the silicon chip 8 experiences the shear in the desired direction.

The measuring element 6 with its plate 11 is preferably mounted, preferably welded, directly on the strain body 3 over the whole of its periphery. By this means a secure joint can be created. In addition and as shown in FIG. 5, the strain body 3 has in particular within this welded area an opening 22, through which a connection to the circuit board 13 can be made.

FIG. 5 represents an inventive strain transmitter 1 in cross-section on the strain axis 4. Attachment screws 19 secure the strain transmitter 1, in particular the strain body 3, in the end regions 9 to a structure 2. The strain body 3 has a mounting plane 15, on which it sits flat against the structure 2. Since the said strain body 3 has an S-shape in accordance with FIG. 3, the strain body 3 is not represented continuously. The measuring element 6 with the silicon chip 8 is arranged in the central region 10, In accordance with the invention the measuring element 6 in the mounted state sits almost flat against the structure 2, with just a minimum possible separation distance, for example a capillary separation distance 21. This has the advantage that the temperature of the structure is always as closely as possible the same as the temperature on the measuring element 6.

For a measurement on the silicon chip 8 a constant power supply is applied at E+, E− in each case. The voltage V registered between S+ and S− reproduces the measured signal that is caused by the strain on the chip. In accordance with the invention, in addition to the voltage V caused by the strain, the current local temperature T1 can also be read out from the silicon chip 8. To this end, the bridge voltage between E+ and E− is measured at a constant power supply. If the static temperature on the chip 8 alters, the resistances also alter, without any strain being present on the chip. This alteration of the bridge resistance can be registered as an alteration of the bridge voltage at E+, E−, as a result of which a first temperature Ti of the structure can be determined.

On the basis of these values V, T1, the strain on the structure 2 can be determined with the aid of calibration tables. Thus, static temperature conditions can be compensated for. Static temperature conditions are temperatures that can be raised or lowered, but over a longer period of time are constant.

Measurement errors caused by static temperature conditions can be compensated for in the above-described manner. Accordingly, the chip 8 can also be designed as a first temperature sensor.

As shown in FIG. 5, the strain transmitter 1 is preferably also provided with an amplifier 17, with a terminal connection 20 to an evaluation unit, not represented. In particular, the amplifier 17 can be attached to the measuring element 6 with electrical contacts, or with a further connector on the connector 14. In the event of a malfunction of the amplifier 17, the latter can easily be detached and replaced, without the strain transmitter 1 having to be detached from the structure 2 for this purpose.

The amplifier 17 is preferably a twin-channel amplifier with two different output ranges. In this manner, it can be ensured that both very small and very large signals can be transmitted with the same strain transmitter.

In particular, the amplifier 17 can comprise a second temperature sensor 16 for purposes of compensating for measurement errors that are caused by temperature fluctuations.

Using an additional temperature sensor 16, a second local temperature T2 can be determined. As soon as the temperatures T1, T2 deviate from one another, static temperature conditions no longer prevail, but rather temperature fluctuations. When dynamically unequal temperatures T1, T2 have been detected, the strain determined on the structure 2 can be corrected using further calibration curves to compensate for the dynamic temperature fluctuations.

LIST OF REFERENCE SYMBOLS

1 Strain transmitter
2 Structure
3 Strain body
4 Strain axis

5 Attachment devices
6 Measuring element
7 Full bridge
8 Silicon chip
9 End region
10 Central region
11 Plate
12 Electrical contacts
13 Circuit board
14 Connector
15 Mounting plane
16 Second temperature sensor
17 Amplifier
18 Connections
19 Attachment screws
20 Terminal connection
21 Capillary separation distance
22 Opening
23 Insulated conducting tracks
R Resistance
E+, E– Power supply
S+, S– Voltage drop of the measured signal
V Voltage for purposes of determining the strain
T1 Temperature on the plate and on the structure
T2 Temperature remote from the structure, ambient temperature

The invention claimed is:

1. A strain transmitter for purposes of detecting a strain on a structure, comprising:
    a strain body with a strain axis wherein the strain body has a shape similar to that of an S, with two outer end regions and a central region, wherein the connections of the central region to the outer regions are arranged symmetrically with respect to a central point, external to the strain axis;
    two attachment devices spaced apart from each other and connected to the strain body for purposes of attaching the strain body to the structure, a first one of the two attachment devices connected to a first one of the outer regions and a second one of the two attachment devices connected to a second one of the outer regions;
    a measuring element, which is arranged centrally on the central region of the strain body on the strain axis between the attachment devices and includes a plate, a chip, a full bridge, a circuit board and electric contacts;
    wherein the plate having a front side and a back side disposed opposite the front side, and the strain body is attached to the back side of the plate and defines a continuous opening extending to the back side of the plate,
    wherein the chip is a piezo-resistive silicon chip having its full surface mounted to the back side of the plate and configured to conduct static measurements such that in the strained state the chip outputs a voltage proportional to its strain,
    wherein the full bridge is connected to the chip, and
    wherein the electric contacts are led from the chip via the circuit board.

2. The strain transmitter in accordance with claim 1, wherein the measuring element comprises a connector, wherein the electric contacts are led from the silicon chip via the circuit board to the connector.

3. The strain transmitter in accordance with claim 1, wherein the full bridge comprises resistances, which are arranged at a 45° angle to the strain axis.

4. The strain transmitter in accordance with claim 1, wherein the strain body has a shape similar to that of an S, with two outer end regions with the attachment devices, also a central region with the measuring element, wherein the connections of the central region to the outer regions are arranged symmetrically with respect to a central point, external to the strain axis.

5. The strain transmitter in accordance with claim 1, wherein in the event of a strain on the strain body the measuring element can register a shear stress.

6. The strain transmitter in accordance with claim 1, wherein the silicon chip comprises a first temperature sensor for purposes of compensating for measurement errors that are caused by temperature fluctuations.

7. The strain transmitter in accordance with claim 1, wherein the strain transmitter further comprises an amplifier carried by the strain body and having a terminal for connection to an evaluation unit.

8. The strain transmitter in accordance with claim 7, wherein the amplifier is attached on the measuring element with electrical contacts, which are mounted on the plate.

9. he strain transmitter in accordance claim 7, wherein the amplifier is a twin-channel amplifier with two different output ranges.

10. The strain transmitter in accordance with claim 7 further comprising a first temperature sensor included in the chip for purposes of compensating for measurement errors that are caused by temperature fluctuations, wherein the amplifier comprises a second temperature sensor for purposes of compensating for measurement errors that are caused by dynamic temperature fluctuations.

11. A strain transmitter for purposes of detecting a strain on a structure, comprising:
    a strain body with a strain axis;
    two attachment devices spaced apart from each other and connected to the strain body for purposes of attaching the strain body to the structure and defining a mounting plane, which in the mounted state of the strain transmitter sits flat against the structure,
    a measuring element which is arranged centrally on the strain body on the strain axis between the attachment devices and includes a plate, a chip, a full bridge, a circuit, board and electric contacts;
    wherein the measuring element is mounted in the strain transmitter adjacent to this mounting plane and spaced apart from the mounting plane by a capillary separation distance;
    wherein the plate having a front side and a back side disposed opposite the front side, and the strain body is attached to the back side of the plate and defines a continuous opening extending to the back side of the plate,
    wherein the chip is a piezo-resistive silicon chip having its full surface mounted to the back side of the plate and configured to conduct static, measurements such that in the strained state the chip outputs a voltage proportional to its strain,
    wherein the full bridge is connected to the chip, and
    wherein the electric contacts are led from the chip via the circuit board.

12. A method for purposes of registering a strain on a structure using a strain transmitter that comprises:
    a strain body with a strain axis,
    attachment devices connected to the strain body for purposes of attaching the strain body to the structure,
    a measuring element, which is arranged centrally on the strain body on the strain axis between the said attachment devices, wherein the measuring element includes a plate on which a piezo-resistive silicon chip is mounted over the full surface area of the chip, which can conduct static measurements, is connected to a full bridge, in the strained state outputs a voltage proportional to its strain, and includes a first temperature sensor for purposes of compensating for measurement errors that are caused by temperature fluctuations, the measuring element further including a circuit board and electric contacts, which are led from the silicon chip via the circuit board, wherein the plate having a front side and a back side disposed opposite the front side, wherein the strain body is attached to the back side of the plate and defines a continuous opening extending to the back side of the plate, wherein from the silicon chip is read out the voltage V caused by the strain, also the current local temperature $T1$, and in that on the basis of these values V, $T1$ and also calibration tables, the strain on the structure is determined so as to compensate for static temperature conditions.

13. The method in accordance with claim 12, using a second temperature sensor, wherein on the second temperature sensor a second local temperature $T2$ is determined, wherein in the event of detecting unequal temperatures $T1$, $T2$ the strain determined on the structure is corrected so as to compensate for dynamic temperature fluctuations.

14. The method in accordance with claim 12, further comprising the step of maintaining a capillary separation distance between the structure and the front side of the plate so that no friction between the plate and the structure distorts the measurement.

* * * * *